United States Patent
Hunter, Jr. et al.

(10) Patent No.: US 11,488,729 B2
(45) Date of Patent: Nov. 1, 2022

(54) PROPELLANT GRADING FOR LASER-DRIVEN MULTI-SHELL INERTIAL CONFINEMENT FUSION TARGET

(71) Applicants: Robert O. Hunter, Jr., Aspen, CO (US); Eric W. Cornell, Colorado Springs, CO (US)

(72) Inventors: Robert O. Hunter, Jr., Aspen, CO (US); Eric W. Cornell, Colorado Springs, CO (US)

(73) Assignee: INNOVEN ENERGY LLC, Colorado Springs, CO (US)

( * ) Notice: Subject to any disclaimer, the term of this patent is extended or adjusted under 35 U.S.C. 154(b) by 0 days.

(21) Appl. No.: 17/192,748

(22) Filed: Mar. 4, 2021

(65) Prior Publication Data
US 2021/0350943 A1 Nov. 11, 2021

Related U.S. Application Data

(60) Provisional application No. 62/984,869, filed on Mar. 4, 2020.

(51) Int. Cl.
| | | |
|---|---|---|
| *G21B 1/19* | (2006.01) | |
| *G21B 1/03* | (2006.01) | |
| *G21B 1/23* | (2006.01) | |

(52) U.S. Cl.
CPC ............ *G21B 1/19* (2013.01); *G21B 1/03* (2013.01); *G21B 1/23* (2013.01)

(58) Field of Classification Search
CPC ... G21B 1/03; G21B 1/19; G21B 1/23; G21B 1/15; Y02E 30/10
USPC ................ 376/102, 103, 151, 152
See application file for complete search history.

(56) References Cited

U.S. PATENT DOCUMENTS

| | | | | |
|---|---|---|---|---|
| 4,272,320 A * | 6/1981 | Lindl | ........ | G21B 1/19 376/152 |
| 4,376,752 A * | 3/1983 | Nuckolls | ........ | G21B 1/19 376/151 |
| 4,693,938 A * | 9/1987 | Darling | ........ | G21B 1/19 428/407 |
| 9,466,397 B2 * | 10/2016 | Amendt | ........ | G21B 1/03 |
| 2007/0237278 A1 * | 10/2007 | Lamont | ........ | G21B 1/03 376/100 |
| 2008/0247930 A1 * | 10/2008 | Hotto | ........ | C01B 32/156 423/262 |
| 2008/0256850 A1 * | 10/2008 | Kley | ........ | G01Q 70/14 44/502 |
| 2011/0261919 A1 * | 10/2011 | Sefcik | ........ | G21B 1/23 376/152 |

(Continued)

*Primary Examiner* — Darlene M Ritchie

(57) ABSTRACT

A confinement chamber for Inertial Confinement Fusion (ICF) may include a closed hohlraum and ICF target wherein the ICF target may comprise a central spherical fuel region, inner shell, outer fuel region, outer shell, and propellant region. A multitude of cylindrical beam channels may penetrate the entire thickness of the hohlraum. At the end of each cylindrical beam channel, where they exit the hohlraum, is a hemispherical cavity. Centered in the curvature of each cavity, and coaxial with each beam channel is a gold foam radiator. By layering materials or grading the density of a material in the propellant region of the closed hohlraum ICF target, the pressure profile on the outer shell may be tailored.

12 Claims, 1 Drawing Sheet

(56) References Cited

U.S. PATENT DOCUMENTS

Figure 1:
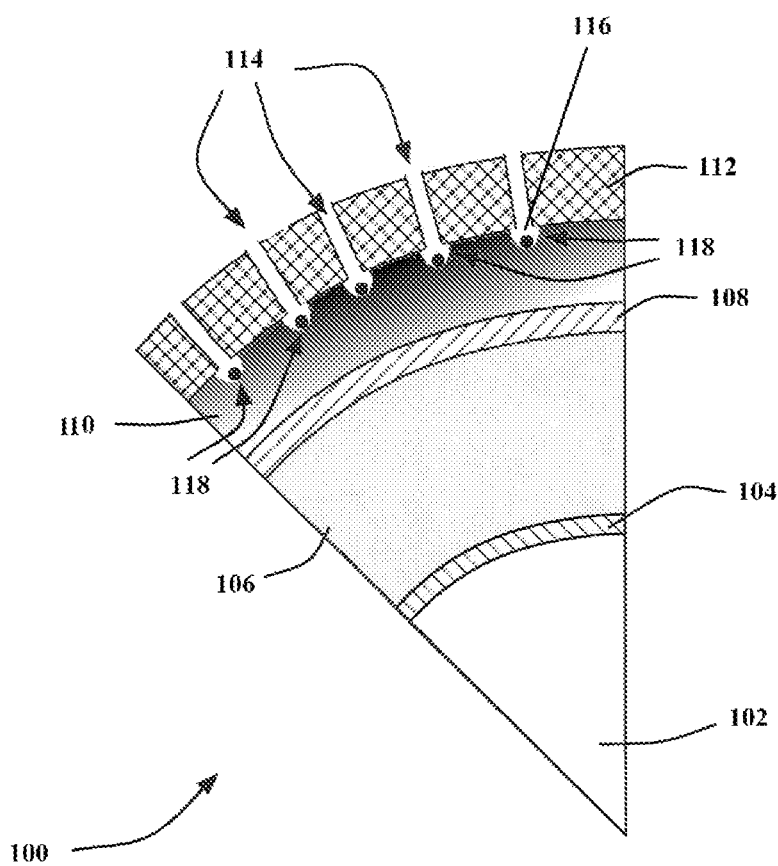

| | | | | |
|---|---|---|---|---|
| 2011/0286563 A1* | 11/2011 | Moses | G21B 1/19 | 376/146 |
| 2012/0114088 A1* | 5/2012 | Amendt | G21B 1/23 | 376/150 |
| 2013/0308736 A1* | 11/2013 | Kucheyev | G21B 1/19 | 376/151 |
| 2014/0348283 A1* | 11/2014 | Perkins | G21B 1/03 | 376/103 |
| 2015/0294743 A1* | 10/2015 | Zheng | G21B 1/15 | 376/107 |
| 2017/0213603 A1* | 7/2017 | Galloway | G21B 1/19 | |
| 2019/0057780 A1* | 2/2019 | Hunter, Jr. | G21B 1/03 | |
| 2019/0139651 A1* | 5/2019 | Cornell | G21B 1/03 | |

* cited by examiner

PROPELLANT GRADING FOR LASER-DRIVEN MULTI-SHELL INERTIAL CONFINEMENT FUSION TARGET

CROSS-REFERENCE TO RELATED APPLICATIONS

This application claims the benefit of U.S. Provisional Application No. 62/984,869 filed on Mar. 4, 2020, which is incorporated herein by reference.

BACKGROUND

Nuclear fusion by inertial confinement (Inertial Confinement Fusion or "ICF") utilities nuclear fusion reactions to produce energy. In most types of ICF systems, an external drive mechanism, such as a laser, delivers energy to a target containing nuclear fusion fuel. The target is designed to use this energy to compress, heat and ignite the fusion fuel within it. If a sufficient amount of fuel is compressed sufficiently and heated sufficiently, a self-sustaining fusion reaction can occur, in which energy produced by fusion reactions continues to heat the fuel ("ignition"). The inertia of the compressed fuel can keep it from expanding long enough for significant energy to be produced, before expansion of the fuel and the resultant cooling terminates the fusion reaction. Most conventional ICF target designs involve a spherical target which is imploded symmetrically from all directions, relying on stagnation of inwardly-accelerated fuel at the center of the sphere to produce the required densities and temperatures.

Production of the very high temperatures and densities required for fusion ignition may require a substantial amount of energy. The exact amount of energy required depends on the specific target design in use. In order to be useful for energy generation, the target must be capable of producing more energy from fusion reactions than was required to ignite it. In addition, the amount of energy required by the target must be physically and/or economically realizable by the drive mechanism being used.

For this reason, conventional ICF target designs have focused on achieving the required temperatures and densities as efficiently as possible. These designs are often complex in their construction and operation, and sensitive to imperfection in the target's manufacturing and to non-uniformity in the delivery of energy to the target from the drive mechanism. Imperfections and non-uniformity can lead to asymmetry in the target's implosion, which may reduce the densities and temperatures achieved, potentially below the threshold required for ignition. Furthermore, successful operation of these complex designs often requires achieving a precise balance between multiple competing physical processes, many of which are poorly understood and difficult to model. When actually constructed and deployed, these complex ICF target designs often fail to perform as their designers intended, and to date none have actually succeeded in producing ignition.

The conventional approach to ICF target design is exemplified by the Department of Energy's program, National Ignition Facility ("NIF") target design. NIF target design, as described in Lindl (Physics of Plasmas v11, number 2), consists of a mostly plastic or beryllium ablator region which surrounds a cryogenic D-T ice, and a central void which is filled with very low-density D-T gas. The target is then placed in a cylindrical hohlraum. The entire target assembly (hohlraum and target) are then placed in the target chamber, and the hohlraum illuminated with a number (192) of discrete beams of laser light. The hohlraum then converts the energy to x-rays, which then ablate the ablator region, and by the reactive force, drives the D-T inward. The combination of a non-spherical hohlraum and illumination leads directly to spatial non-uniformities in the target absorbed energy. Even in configurations with spherical hohlraums, the illumination is never spherically symmetric because entrance holes are required to admit the beams. This unsymmetrical illumination leads to unsymmetrical energy absorption by the target which in turn seeds instabilities that can prevent the temperature and density from achieving the necessary values to initiate a useful or self-sustaining fusion reaction.

In practice, the NIF target has so far failed to ignite, achieving peak temperatures and densities of about 3 keV and or a peak areal density ($\rho r$) of approximately 0.1 g/cm$^2$ in the hotspot, short of the 10 keV and 0.3 g/cm$^2$ anticipated to be required for ignition. There is no clear consensus on why the NIF target has failed to achieve ignition, but it appears that this failure may be partially due to low-order asymmetry in the hotspot formation and lower than expected implosion velocities.

There is a need to design an ICF target that compresses the main fuel section without the need for the external drive mechanism later in time during the implosion. It would be advantageous to tailor the pushing profile in the outer shell, specifically to push later in time.

SUMMARY

The spectrum of energy output from an ICF target may be comprised of charged particles, neutrons, x-ray radiation, and an expanding field of target debris. For many target and containment chamber systems, the x-ray radiation component may be the most challenging to contain. Conventional containment chamber designs absorb the radiation energy directly on the surface of the chamber wall. For targets that emit a large amount of energy as radiation, a very large chamber of very complex wall design may be required to avoid unacceptable wall damage from the radiation.

Embodiments described herein can contain the radiation output of an ICF target by absorbing the radiation energy. In some embodiments, a confinement chamber for Inertial Confinement Fusion (ICF) may include a closed hohlraum and ICF target wherein the ICF target may comprise a central spherical fuel region, inner shell, outer fuel region, outer shell, and propellant region. A multitude of cylindrical beam channels penetrate the entire thickness of the hohlraum. At the end of each beam channel, where they exit the hohlraum, is a hemispherical cavity. Centered in the curvature of each cavity, and coaxial with each beam channel is a gold foam radiator. By layering materials or grading the density of a material in the propellant region of the closed hohlraum ICF target, the pressure profile on the outer shell may be tailored. It would be advantageous to tailor the pushing profile in the outer shell, specifically to push later in time.

DRAWINGS

FIG. 1 shows a target assembly containing a propellant region.

SPECIFICATION

Inertial Confinement Fusion reactor chambers can be designed to contain an ICF target being imploded and capture the resulting energy output from the reaction in the forms of neutrons, radiation, and/or debris. Such chambers can generally include a combination of neutron moderating layers, neutron absorbing layers, neutron shielding layers, radiation capturing layers, sacrificial layers, shock absorbers, tritium breeding layers, tritium breeders, coolant systems, injection nozzles, inert gas injection nozzles, sputterers, sacrificial coating injection nozzles, beam channels, target supporting mechanism, and/or purge ports, among others. Generally speaking, neutron moderating material can be constructed from graphite and may be naturally or artificially doped, combined, allowed, and/or mixed with neutron absorbing material and/or have a thickness of one or more neutron mean free path lengths (e.g., 0.3-1.0 m). Neutron absorbing material may include boron, cadmium, lithium, etc. Radiation tiles or layers can be disposed throughout the chamber to absorb radiation from the reaction.

Such cylindrical chambers can be used with both directional and omni-directional targets. For instance, for use with directional targets where neutrons are not directed and radiations and debris are directed along the longitudinal length of the cylinder, a chamber can have neutron moderating and/or absorbing material concentrated near the center of the cylinder, and radiation and debris collecting material can be concentrated in the outer sections of the cylindrical chamber. Various other specific embodiments and configurations are described.

The term "approximately" and "about" refers a given value ranging plus/minus 15%. For example, the phrase "approximately 10 units" is intended to encompass a range of 8.5 units to 11.5 units.

The term "neutron" refers to a subatomic particle with no electrical charge. Their lack of a charge means that free neutrons generally have a greater free range in matter than other particles.

The term "proton" refers to a subatomic particle with a positive electrical charge.

The term "electron" refers to a subatomic particle with a negative electrical charge, exactly opposite to that of a proton and having less mass than a proton and a neutron.

The term "atom" refers to a particle of matter, composed of a nucleus of tightly bound protons and neutrons, with an electron shell. Each element has a specific number of protons. Atoms under ordinary conditions have the same number of electrons as protons, so that their charges cancel.

The term "isotope" refers to atoms of the same element that have the same number of protons, but a different number of neutrons. Isotopes of an element are generally identical chemically but have different probabilities of undergoing nuclear reactions. The term "ion" refers to a charged particle, such as a proton or a free nucleus.

The term "plasma" refers to the so-called fourth state of matter, beyond solid, liquid, and gas. Matter is typically in a plasma state when the material has been heated enough to separate electrons from their atomic nuclei.

The term "Bremsstrahlung radiation" refers to radiation produced by interactions between electrons and ions in a plasma. One of the many processes that can cool a plasma is energy loss due to Bremsstrahlung radiation.

The term "runaway burn" refers to a fusion reaction that heats itself and reaches a very high temperature. Because the D-T reaction rate increases with temperature, peaking at 67 keV, a D-T plasma heated to ignition temperatures may rapidly self-heat and reach extremely high temperatures, approximately 100 keV, or higher.

For targets burning advanced fuels such as D-D, but particularly D-$^3$He and p-$^{11}$B, the output may be substantially larger in radiation and less in neutrons and debris. The radiation output may be at 1 KeV in a blackbody spectrum (if the interior structure of target bleached, would look like Bremsstrahlung). However, if the lower energy part of the spectrum is blocked, then the photon energy would be, say, all above 2 KeV. The spectrally averaged deposition rate is then in the range of 10 cm$^2$/g for Beryllium. Obviously, the hotter the target, the better. By 10 KeV, the absorption value would be approaching 0.1 cm$^2$/g leading to 3 m$^2$ per side. In such a case, a small radius (1 meter) cylinder might be sufficient. This class of target and converter has the potential for very compact converters.

For our purposes, let us assume the ICF target is filled with deuterium and tritium (D-T) as the entire fuel source. However various other fuel sources are possible such as but not limited to the following: D-$^3$He, D-D, and p-$^{11}$B. This implies a small tritium breeding ratio (1.011.1) in the large energy section will be more than adequate to generate substantial amounts of tritium relative to the consumption by targets. Tritium breeding ratio is the amount of tritium, including the unburnt tritium and tritium bred in the converter, after full yield, over the initial tritium in the target. For pure D-T targets with a large fraction of the energy appearing as 14 MeV neutrons and a total tritium breeding ratio of about 1-10% more than the tritium burned, a converter with some neutron multiplication is indicated.

The term "Z" refers to the atomic number of an element, i.e., the number of protons in the nucleus. The term "A" refers to the atomic mass number of an element, i.e., the number of protons and neutrons in the nucleus. At the pressures and temperatures involved in imploding and burning ICF targets, specific material properties that one observes in everyday life (hardness, strength, room-temperature, thermal conductivity, etc.) may be irrelevant, and the hydrodynamic behavior of a material can depend most strongly on the material's average atomic number, atomic mass number, and solid density.

As such, in discussing material requirements in ICF targets, it is convenient to discuss classes of material. For the purposes of the following discussion, the term "low-Z" will refer to materials with an atomic number of 1-5 (hydrogen to boron); the term "medium-Z" will refer to materials with an atomic number of 6-47 (carbon to silver); and the term "high-Z" will refer to materials with an atomic number greater than 48 (cadmium and above). Unless otherwise stated, the use of these terms to describe a class of material for a specific function is intended only to suggest that this class of material may be particularly advantageous for that function, and not (for instance) that a "high-Z" material could not be substituted where a "medium-Z" material is suggested, or vice-versa.

Specific material choice is still important, where indicated, as different isotopes of the same element undergo completely different nuclear reactions, and different elements may have different radiation opacities for specific frequencies. The differing solid densities of materials with similar Z is also important for certain design criteria.

Target assembly 100 (FIG. 1) is defined as the ICF target and hohlraum. Target assembly 100 comprises a central spherical fuel region, inner fuel region 102. Inner fuel region 102 may be filled with deuterium-tritium gas having a low-density of about 0.1 g/cm$^3$. Surrounding inner fuel region 102 is inner shell 104 and outer shell 108. Inner shell 104 may be a spherical shell of solid tungsten with an outer radius of about 0.0821 cm. Outer shell 108 may be a spherical shell of tungsten with an inner radius of about 0.2293 cm and an outer radius of about 0.2355 cm. In the space between inner shell 104 and outer shell 108 is outer fuel region 106. Outer fuel region 106 may be filled with deuterium-tritium gas having a low-density of about 0.21 g/cm$^3$. A density higher than this would make deuterium-tritium to be in a solid-state phase.

Surrounding outer shell 108 is propellant region 110. Propellant region 110 may have an outer radius of about 0.3083 cm and comprise beryllium foam at a density of about 1.0 g/cm$^3$. Surrounding propellant region 110 is hohlraum 112, a spherical shell of solid tungsten and may have an outer radius of about 0.3212 cm. A multitude of cylindrical beam channels 114, each having a diameter of 100 μm, penetrate the entire thickness of hohlraum 112. The long axis of each beam channel 114 is normal to the surface of hohlraum 112. At the end of each beam channel 114, where they exit hohlraum 112, is a hemispherical cavity 116 in propellant region 110. These cavities 116 are approximately 100 μm in radius. Centered in the curvature of each cavity 116, and coaxial with each beam 114 is a gold foam radiator 118. Each gold foam radiator 118 is a sphere of gold foam 50 μm in radius, having a density of approximately 10 g/cm$^3$.

Propellant region 110 may be made up of one single material or a plurality of different materials. One may layer a plurality of different materials across the propellant region 110; for example, by alternating two materials such as beryllium and carbon in a layering fashion. Or one may change the density of a material across the propellant region 110 by gradually changing the density of a material from an outer to inner region; for example, by slowly increasing the density of a material such as carbon from about 0.1 g/cm$^3$ to about 2.0 g/cm$^3$. Further, one may change the density of a material across the propellant region 110 by using a distinctly different density of a material; for example, using a material such as carbon with a density of about 0.5 g/cm$^3$ in the lower half and carbon with a density of about 1.8 g/cm$^3$ in the upper half. In addition to changing the density gradient in various ways as discussed above, one could change the atomic number (Z) of the material, by either doping the propellant region 110 with a low-Z material or a high-Z material.

Target assembly 100 may be ignited in the following manner. Target assembly 100 is placed in an ICF reaction chamber, configured to contain the energy that will be released by the target. An ICF laser is configured in such a way as to produce a pattern of 202 spots of laser light, each 100 microns in diameter, aligned with each of the 202 beam channels 114. These spots are produced as a 0.5 nanosecond pulse of approximately constant power having a total energy of 9.9 MJ, with the pulse energy evenly distributed between all 202 spots.

The laser light is first absorbed in the gold radiators 118 through a combination of collisional and resonance absorption, and this may occur before significant hydrodynamic motion occurs in the target. The gold radiators 118 re-radiate the laser energy as x-ray radiation into the propellant region 110. The propellant region 110 becomes ionized and optically thin to x-ray radiation. Radiation transport and thermal conduction in the propellant region distributes the laser energy throughout the propellant region 110.

Ultimately, approximately 1.9 MJ of energy may be lost due to radiation and heated material escaping back out the beam channels 114, and the total energy ultimately coupled to the target assembly in this embodiment may be approximately 8 MJ. The total energy coupled to metal shell 108 and the components inside (the "fuel capsule") may be approximately 2.25 MJ.

As propellant region 110 is energized, radiation penetrates outer shell 108 which heats an outer layer of the shell material. The outward expansion of this outer layer of outer shell 108 is tamped by the material pressure in propellant region 110 and the mass of metal hohlraum 112. A denser material requires more mass to tamp the outer shell 108, this additional pressure on the outer shell 108 prevents it from expanding outwards. The inner part of outer shell 108 is thus impulsively accelerated inwards, driving a strong shock into outer fuel region 106. If the lower half of propellant region 110 has a density of about 0.5 g/cm$^3$ and the upper half has a density of about 1.8 g/cm$^3$, the upper region will absorb more energy; however, the lower region will tamp the outer shell 108 first, whereas the upper region, being more distant from outer shell 108 will tamp later in time. By grading the density of propellant region 110, one could tailor the pushing profile (pressure vs. time) on the outer shell 108.

When the shock driven through outer fuel region 106 reaches inner shell 104, the shell will be accelerated inwardly and may reach a peak inward velocity of approximately 2.0×10$^7$ cm/s. The inward motion of inner shell 104 and the convergence of the shock it launches will result in compression and heating of the fuel in inner fuel region 102. The peak areal density (ρr) reached in inner fuel region 102 may be 1.1 g/cm$^2$. Because of this relatively high areal density, the dominant energy loss mechanism of the fuel may be radiation emission. The high radiation opacity of inner shell 104 lowers the radiative energy loss of the fuel in inner fuel region 102 by reflecting a substantial fraction of radiated energy back into inner fuel region 102. Because of this, ignition of the fuel in inner fuel region 102 may occur at a relatively low temperature of 2.5-2 keV. Once ignited, the temperature of the fuel in inner fuel region 102 may rise further due to self-heating effects, and fusion reactions in inner fuel region 102 may produce a substantial amount of energy, e.g., approximately 36 MJ.

The high temperatures and pressures produced by fusion yield in inner fuel region 102 drive inner shell 104 outward. Outer fuel region 106 is compressed and heated by the outward motion of inner shell 104 and the remaining inward motion of outer shell 108. Outer fuel region 106 is further heated by scattering of neutrons produced by fusion reactions in inner fuel region 102 and/or by radiation emitted by fuel in inner fuel region 102. This heating and compression may lead to substantial additional fusion fuel reactions in outer fuel region 106, which in this embodiment may produce an additional 5 MJ of yield.

In some embodiments, outer fuel region 106 may ignite and undergo runaway burn, and the majority of fusion yield from the target may be produced in outer fuel region 106. In some embodiments, heating by neutron scattering may be sufficient to heat outer fuel 106 to ignition temperature, before the PdV heating from inner shell 104 becomes significant. Increasing ρr of outer fuel region 106, e.g., by scaling the entire target proportionally to a greater size, may increase the relative fraction of yield produced by outer fuel region 106 and/or lower the threshold required for ignition of outer fuel region 106.

The implosion process of this embodiment has numerous advantages relative to that utilized by conventional ICF targets, such as a NIF-styled target. This "propellant drive" mechanism utilizing a short laser pulse to energize a closed hohlraum is straightforward to model and analyze: the spherically symmetric geometry is less complicated than the sphere-in-cylinder geometry used in conventional ICF, and the short pulse length means that the laser absorption and target drive are accomplished before significant hydrodynamic motion has occurred. As a result, laser coupling and absorption in the target is separated in time from implosion of the target. Furthermore, due to the high reflectivity of outer shell 108 and hohlraum 112, there may be significant radiation smoothing of the temperature non-uniformity in propellant 110, which in some embodiments may substantially improve the uniformity of the target drive and smooth any non-uniformity in the laser energy delivered.

Additionally, the embodiments discussed in this application are exemplary and not an exhaustive enumeration of variants. Features discussed as part of separate embodiments may be combined into a single embodiment. Further, embodiments may make use of other features known in the art but not explicitly cited in this application.

The invention claimed is:

1. A confinement chamber for Inertial Confinement Fusion (ICF), the confinement chamber comprising:
   an ICF target assembly positioned within the confinement chamber to receive x-ray radiation;
   the ICF target assembly comprising:
      an inner fuel region, wherein the inner fuel region is centrally located within said ICF target assembly;
      at least one shell region, wherein the at least one shell region surrounds the inner fuel region;
      a propellant region, wherein the propellant region surrounds the at least one shell region;
      a hohlraum, wherein the hohlraum surrounds the propellant region and comprises a plurality of cylindrical beam channels that penetrate the entire thickness of the hohlraum in a direction toward the center of the ICF target assembly and along an axis normal to the surface of the hohlraum;
      a plurality of hemispherical cavities, wherein each one of the hemispherical cavities is located at the end of each of the plurality of cylindrical beam channels in the propellant region;
      a plurality of spherical gold foam radiators, wherein each one of the plurality of spherical gold foam radiators is located within a center of curvature of each one of the plurality of hemispherical cavities; and
      the propellant region further comprises a plurality of distinctly different materials, and wherein the plurality of distinctly different materials are gradually distinct across the propellant region such that a density of the material located in an inner portion of the propellant region is approximately ¼ of a density of the material in an outer portion of the propellant region.

2. The confinement chamber of claim 1, wherein each of the distinctly different materials of the propellant region are further different in atomic number of material.

3. The confinement chamber of claim 2, further comprising:
   an outer fuel region, wherein the outer fuel region is surrounded by the propellant region.

4. The confinement chamber of claim 3, wherein the at least one shell region, further comprises an inner shell region and an outer shell region, wherein the hohlraum directly surrounds the propellant region which directly surrounds the outer shell region which directly surrounds the outer fuel region which directly surrounds the inner shell region which directly surrounds the inner fuel region.

5. The confinement chamber of claim 4, wherein the propellant region further comprises beryllium foam.

6. The confinement chamber of claim 5, wherein the hohlraum further comprises solid tungsten.

7. A method of igniting a target assembly in an Inertial Confinement Fusion (ICF) reaction chamber, the method comprising:
   receiving laser light within a target chamber;
   causing an ICF target assembly within the target chamber to receive x-ray radiation upon interaction of the laser light with the ICF target assembly, wherein the ICF target assembly comprises:
      an inner fuel region, wherein the inner fuel region is centrally located within said ICF target assembly;
      at least one shell region, wherein the at least one shell region surrounds the inner fuel region;
      a propellant region, wherein the propellant region surrounds the at least one shell region;
      a hohlraum, wherein the hohlraum surrounds the propellant region and comprises a plurality of cylindrical beam channels that penetrate the entire thickness of the hohlraum in a direction toward the center of the ICF target assembly and along an axis normal to the surface of the hohlraum; and
      wherein the propellant region further comprises a plurality of distinctly different materials, and wherein the plurality of distinctly different materials are gradually distinct across the propellant region such that a density of the material located in an inner portion of the propellant region is approximately ¼ of a density of the material in an outer portion of the propellant region; receiving the laser light within a plurality of hemispherical cavities, wherein a hemispherical cavity is located at the end of each one of the plurality of cylindrical beam channels;
   absorbing the laser light in a plurality of spherical gold foam radiators and re-radiating the laser light as x-ray radiation into the propellant region, wherein a spherical gold foam radiator is located within each one of the plurality of hemispherical cavities.

8. The method of claim 7, wherein each of the materials of the propellant region are different materials in either density or material.

9. The method of claim 8, wherein the ICF target assembly further comprises:
   an outer fuel region, wherein the outer fuel region is surrounded by the propellant region.

10. The method of claim 9, wherein the at least one shell region, further comprises:
    an inner shell region and an outer shell region, wherein the hohlraum directly surrounds the propellant region which directly surrounds the outer shell region which directly surrounds the outer fuel region which directly surrounds the inner shell region which directly surrounds the inner fuel region.

11. The method of claim 10, wherein the propellant region further comprises beryllium foam.

12. The method of claim 11, further comprising doping the propellant region with a material to change the composition of the propellant region.

* * * * *